March 18, 1969    K. L. SWAFFORD ET AL    3,433,464

MIXING APPARATUS

INVENTOR
Kenneth L. Swafford, Doyal P. Duke
& Roy E. Hazelwood
BY
Attorneys

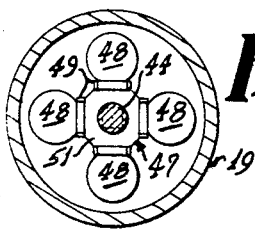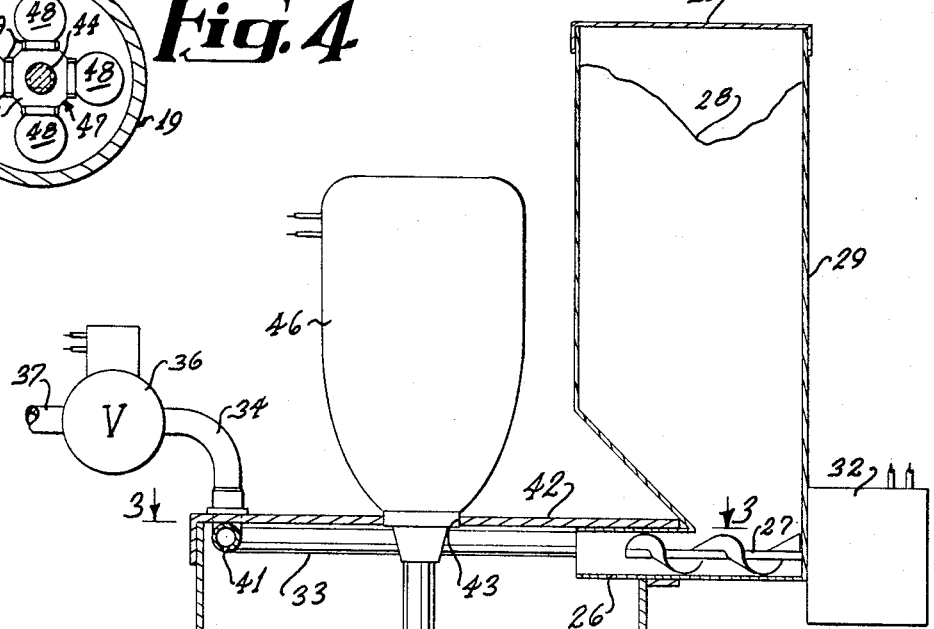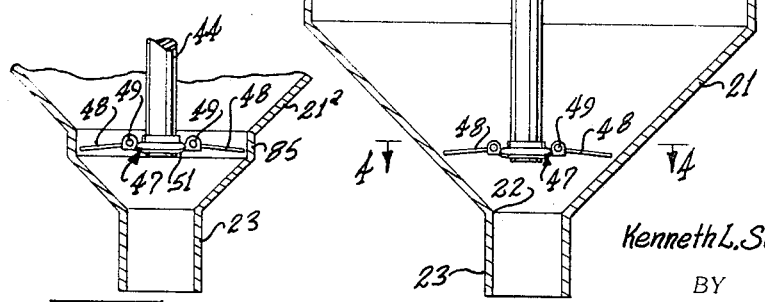

United States Patent Office 3,433,464
Patented Mar. 18, 1969

3,433,464
MIXING APPARATUS
Kenneth L. Swafford, 500 W. Main St., and Doyal P. Duke, Rte. 1, both of Hartselle, Ala. 35640, and Roy E. Hazelwood, Rte. 1, Faulkville, Ala. 35622
Filed Sept. 21, 1967, Ser. No. 669,565
U.S. Cl. 259—8    8 Claims
Int. Cl. B01f 15/02, 7/18

ABSTRACT OF THE DISCLOSURE

Mixing apparatus embodying a chamber having a downwardly converging bottom communicating at its lower end with a discharge passageway. Predetermined amounts of powdered materials and liquid are introduced substantially simultaneously into the upper portion of the chamber and a mixer element rotates within the chamber inwardly of and in spaced relation to the bottom at a speed to impart outward and upward movement to the powdered material and liquid and to draw air into the chamber through the discharge passageway.

Background of the invention

Heretofore in the art to which our invention relates, difficulties have been encountered in mixing dry, powdered materials, such as flavored milk shake mixes with liquids, such as water, due to the fact that lumps are formed as the ingredients are mixed with each other, whereby the mixture is not homogeneous. Also, difficulties have been encountered in maintaining the mixing equipment in a clean and sanitary condition due to the fact that complicated valve mechanism has been required for dispensing the mixture after the ingredients are mixed. Difficulties have also been encountered in supplying a uniform amount of air through the mixture as the ingredients are mixed to provide a smooth and fluffy product.

Brief summary of invention

In accordance with our invention, we introduce predetermined quantities of powdered materials and liquid simultaneously into the upper portion of a mixing chamber having a downwardly converging, frusto-conical bottom which terminates at its lower end in a discharge passageway. The flowing materials engage a rotating mixing element which is mounted for rotation about a vertical axis and is spaced closely from the frusto-conical bottom a distance to permit upward flow of air therebetween while the mixing element is rotating and permit downward flow of the powdered material and liquid therebetween while the mixing element is stationary. The mixing element is rotated at a speed to impart outward and upward movement to the powdered material and to draw air into the lower end of the mixing chamber whereby the materials are thoroughly mixed and do not pass downwardly through the discharge passageway at the lower end of the mixing chamber until the speed of rotation of the mixing element is reduced.

Apparatus embodying features of our invention is illustrated in the accompanying drawings, forming a part of this application, in which:

FIG. 2 is an enlarged, vertical sectional view showing one mixing unit removed from the remainder of the apparatus;

FIG. 4 is a sectional view taken generally along the line 4—4 of FIG. 2;

Figure 1:
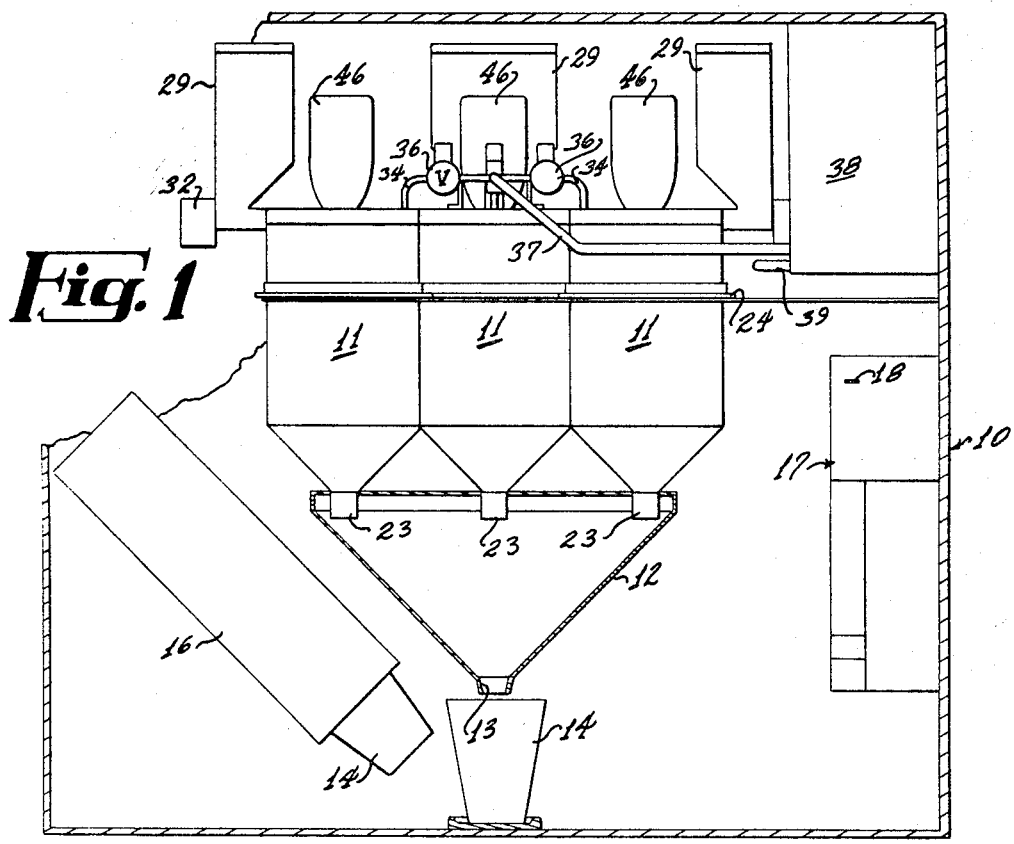
FIG. 1 is a vertical, sectional view, partly broken away, showing three mixing units adapted to discharge the mixed product into a common discharge receptacle.

Referring now to the drawings for a better understanding of our invention, we show a cabinet 10 which is adapted to encase a plurality of mixing units indicated generally at 11. While we have shown three mixing units in FIG. 1 of the drawings, it will be apparent that one or more units may be employed. That is, where the apparatus is employed to dispense a single flavor of a milk shake, the cabinet 10 would encase a single mixing unit 11. However, in most cases, the cabinet 10 would encase mixing units for dispensing more than one flavor of milk shake, such as vanilla, chocolate and strawberry or the like.

In FIG. 1 of the drawings, the mixing units 11 are shown as discharging the mixed product into a single receiving receptacle 12 having downwardly converging walls and a discharge opening 13 for discharging the product into a cup 14. The cups 14 are supplied from a cup dispensing unit 16 which is of a conventional type. Since the construction and operation of such cup dispensers is well known in the art, no further description thereof is deemed necessary. Preferably, the apparatus is coin actuated. The coin actuated mechanism is indicated generally at 17 and is provided with a suitable coin receiving slot 18 in a manner well understood in the art.

As shown in FIG. 2, each mixing unit 11 comprises a cylindrical mixing chamber 19 having vertical side walls 20 which are connected to a downwardly converging, frusto-conical bottom wall 21. The lower end of the frusto-conical bottom wall 21 terminates in a discharge passageway 22 which in turn communicates with a short discharge tube 23. Suitable mounting brackets 24 are carried by the mixing chambers for mounting the same within the cabinet 10. In the drawings, we show the frusto-conical bottom wall 21 as defining with a horizontal plane passing therethrough an included angle of approximately 45°. However, the inclination of the frusto-conical bottom wall 21 can be such that it defines with a horizontal plane passing therethrough an included angle ranging from 35° to 55°.

Communicating with the upper portion of the mixing chamber 19 is a generally horizontal auger housing 26 which extends inwardly of the chamber 19, as shown in FIG. 2. An auger 27 is mounted for rotation within the auger housing 26 and terminates inwardly of the discharge end of the housing 26 whereby liquid does not come in direct contact with the auger 27. That is, the powdered material conveyed by the auger 27 prevents the liquid from engaging the auger 27 whereby a protective crust is formed adjacent the discharge end of the auger housing 26. Powdered material 28, such as a flavored powdered mix for making milk shakes, is supplied to each auger housing 26 by a supply receptacle 29. A suitable, removable cover 31 is provided for each receptacle 29 for adding the powdered material thereto. The auger 27 is driven by an electrical motor 32 which is controlled by means to be described hereinafter whereby the auger 27 is rotated for a predetermined length of time and at a predetermined speed to supply a predetermined quantity of powdered material into the mixing chamber 19 for making each milk shake.

Liquid, such as water, is supplied to the upper portion of the mixing chamber 19 by a substantially annular manifold 33 which communicates with a supply conduit 34 that in turn communicates with a control valve 36 which is also controlled by means to be described hereinafter whereby a predetermined quantity of liquid is introduced into the mixing chamber 19 for each batch of product to be made. The liquid is supplied to the valve 36 by a conduit 37 which in turn communicates with a chiller 38. The liquid is supplied to chiller 38 by a conduit 39. A plurality of discharge openings 41 are provided in the under surface of the liquid supply manifold 33 whereby liquid introduced through the manifold is discharged alongside the inner surface of the vertical wall 20 of mixing chamber 19.

Extending across the top of the mixing chamber 19 is a cover member 42, as shown in FIG. 2. A suitable opening is provided in the cover member 42 for receiving the conduit 34. Also, an opening 43 is provided in the cover member 42 for receiving a vertical shaft 44 of a mixing unit having a motor 46. The housing of the motor 46 engages the opening 43 whereby the motor and the depending shaft 44 are supported by the cover member 42. Mounted at the lower end of the shaft 44 is a mixing element indicated generally at 47. Preferably, the mixing element 47 comprises a plurality of blades 48 which are pivotally connected as at 49 to a support member 51 which in turn is rigidly secured to the shaft 44 and rotates therewith. The shaft 44 and the mixing element 47 carried thereby is rotated at a speed of at least 8,000 revolutions per minute. Preferably, for milk shakes, the shaft 44 is rotated at from 10,000 to 12,000 revolutions per minute. As shown in FIG. 2, the mixing element 47 rotates about a vertical axis and is concentric with and closely spaced from the frusto-conical bottom 21 a distance to permit upward flow of air between the blades 48 and the inner surface of the bottom 21 while the mixing element 47 is rotating and to permit downward flow of the liquid and powdered material therebetween while the mixing element 47 is stationary. In actual practice, we have found that spacing the blades of the mixing element approximately $\frac{1}{16}$ of an inch from the inner surface of the frusto-conical bottom wall 21 is satisfactory in every respect.

Figure 5:
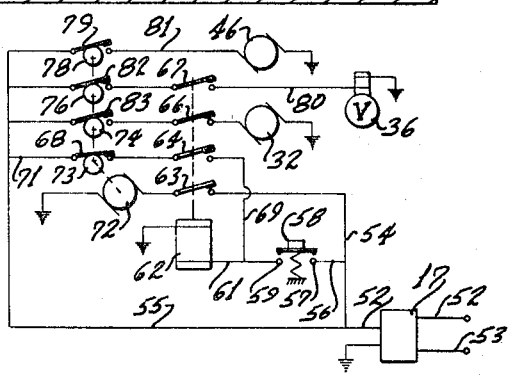
FIG. 5 is a wiring diagram showing the electrical circuit for one mixing unit; and, FIG. 6 is a fragmental, sectional view showing a modified form of our invention.
Figure 3:
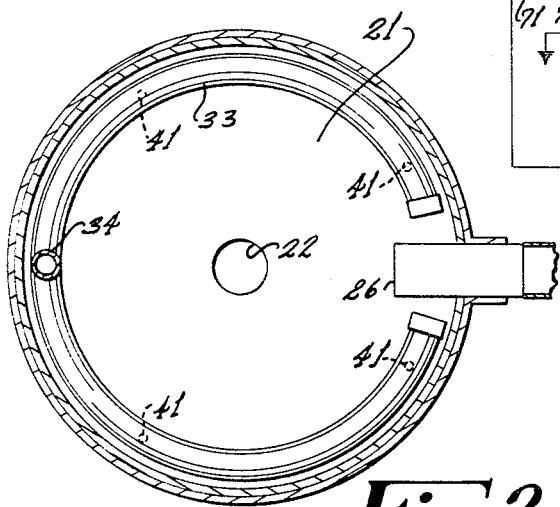
FIG. 3 is a sectional view taken generally along the line 3—3 of FIG. 2.

Referring now to FIG. 5 of the drawings, we show an electrical circuit which may be employed to control a single mixing unit 11. Power is supplied to the coin actuated control unit 17 by lines 52 and 53 with line 53 being grounded, as shown. Line 52 is connected to branch lines 54 and 55. Line 54 is connected by a line 56 to one pole 57 of a selector switch 58 which is employed to select the flavor of mix to be introduced to the housing 26. The other pole 59 of the selector switch 58 is connected by a line 61 to a relay 62 which, when energized, is adapted to close contacts 63, 64, 66 and 67. Contact 64 is connected to a normally closed switch 68 which in turn is connected by a line 69 to line 61 and by a line 71 to line 55 whereby a holding circuit is provided for the relay 62 after it is energized by the selector switch 58.

Switch 63 is connected to a cam motor 72 which drives cams 73, 74, 76 and 78. Cam 78 is adapted to close a switch 79 which is connected at one side to the line 55. The other side of switch 79 is connected by a line 81 to the motor 46 for the mixing element 47.

Cam 76 actuates a switch 82 which is connected at one side to the line 55. The other side of switch 82 is connected to switch 67 which in turn is connected by a line 80 to solenoid actuated valve 36. Accordingly, upon closing the switch 82, with the switch 67 closed, current is supplied to control valve 36 to introduce liquid into the mixing chamber.

Cam 74 actuates switch 83 which is connected at one side to line 55. The other side of switch 83 is connected through switch 66 to motor 32 which rotates auger 27.

From the foregoing description of the electrical circuit shown in FIG. 5, the operation of one of the mixing units will be readily understood. Upon placing a coin in the coin actuated unit 17 and depressing the selector switch 58, current is supplied to the relay 62 which closes contacts 63, 64, 66 and 67 whereupon current is supplied through normally closed switch 68 and switch 64, to provide a holding circuit for the relay 62. Upon closing switch 63 by the relay 62, the cam motor 72 is energized to impart rotation to the cams 73, 74, 76 and 78. Cam 78 is so constructed and shaped that it closes switch 79 immediately to start rotation of the motor 46 for the mixing element 47. In approximately one second, the mixing element 47 is rotating at a speed of approximately 10,000 revolutions per minute. Cams 76 and 74 are so constructed and arranged that upon rotation of the motor 46 at approximately 10,000 revolutions per minute, switches 82 and 83 are actuated simultaneously to supply current to control valve 36 and motor 32 for the auger 27. Accordingly, the liquid is introduced through the openings 41 and the powdered material is introduced through the discharge housing 26 into the upper portion of the mixer chamber 19 substantially simultaneously. A portion of the liquid flows downwardly alongside the inner walls of the mixer chamber 19 thus maintaining the inner surface clean of powdered materials. The motor 32 and the valve 36 are energized for a predetermined length of time whereby a predetermined amount of liquid and powdered material is introduced into the mixing chamber 19. By providing separate cams 74 and 76, the amount of powdered material relative to the amount of liquid can be readily varied by varying the position of the cams.

With the materials thus introduced into the chamber 19, the motor 46 continues to rotate for a predetermined length of time which is controlled by a cam 73. That is, cam 73 is set so as to open switch 68 at the end of the mixing period whereby current to the relay 62 is interrupted to thus cause switches 63, 64, 66 and 67 to move to open position whereupon the apparatus is then ready for another cycle of operation. For milk shakes, the total time of operation of the motor 46 is approximately 15 seconds.

While we have shown the electrical circuit for only one of the mixer units, it will be apparent that the other mixer units are operated by a similar circuit. Also, it will be apparent that modifications may be made in the electrical circuit in a manner well understood in the electrical art.

Upon placing the coin in the coin slot 18 at the beginning of the cycle of operation, a cup 14 is dispensed beneath the discharge opening 13 whereby upon completion of the mixing cycle, the mixed product is discharged through discharge opening 22 into the receptacle 12 and then into the cup 14.

By introducing the powdered material 28 and the liquid substantially simultaneously after the mixing element 47 is rotating at a speed of from 8,000 to 12,000 revolutions per minute, the mixing blades 48 draw air upwardly through the opening 22 causing the air to mix thoroughly with the liquid and powdered material whereby a very fluffy, cream-like product is produced. As the mixture of liquid and powdered material moves down the frusto-conical wall 21, it engages the tips of the mixer blades 48 whereby the mixture is thrown upwardly and outwardly to thoroughly mix the ingredients. The combination of the updraft of air through opening 22, the upward motion imparted to the liquid and powdered materials by the blade 48 and the centrifugal force imparted to the liquid and powdered materials causes the mixture to remain above the mixing element 47 whereby there is no discharge of the mixture until rotation of the mixing element 47 is stopped or the speed of rotation is greatly reduced. Accordingly, we eliminate entirely the necessity of providing a discharge valve unit at the bottom of the mixing chamber 19 for discharging the product at the end of the mixing cycle. That is to say, immediately upon deenergizing motor 46, the mixing element 47 ceases rotation whereby the mixed product immediately begins to flow between and around the mixing blades 48 and then down through the discharge opening 22 and conduit 23 to the receiving chamber 12 whereupon the mix is deposited in the cup 14.

In FIG. 6 of the drawings, we show a slightly modified form of our invention in which the mixing unit is provided with a downwardly converging frusto-conical bottom 21a which is provided with an annular, vertically extending portion 85 directly opposite the blades 48 of the mixing element 47. Accordingly, as the mixture flows downwardly along the frusto-conical bottom wall 21a, it falls onto the tips of the blades 48 whereby the mixture is thrown upwardly and outwardly as described hereinabove. The operation of the apparatus shown in FIG. 6 is substantially identical to the operation of the apparatus shown in FIGS. 1 through 5.

From the foregoing, it will be seen that we have devised improved mixing apparatus which produces a homogeneous mixture. By introducing the liquid and powdered materials substantially simultaneously at the upper portion of the mixing chamber while the mixing element is rotating at a high speed, air is drawn upwardly through the opening 22 and moves countercurrent with the downwardly moving mixture of liquid and powdered materials whereby the air is blended uniformly with the liquid and powdered materials to eliminate lumps in the mix and at the same time produce a very fluffy and cream-like product. Also, by inducing an updraft of air through the opening 22 and causing the mixture to move downwardly along the frusto-conical bottom, the mixture engages the tips of the blades 48 whereby the mixture is continuously thrown upwardly and outwardly to thoroughly mix the liquid and powder materials with the air drawn inwardly through opening 22. Furthermore, by inducing the updraft of air through opening 22 in combination with the upward movement of the mixture and the centrifugal force imparted to the materials, the mix is maintained at a point above the mixing element 47 whereby there is no discharge of the materials until the motor 46 is deenergized, thus eliminating the necessity of complicated discharge mechanism for the product. By controlling the temperature of the liquid discharged from the chiller 38, the temperature of the product discharged from the mixing unit may be readily controlled.

While we have shown our invention in but two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. In apparatus for mixing powdered material with liquid:
    (a) a mixing chamber having a downwardly converging, frusto-conical bottom terminating at its lower end in a discharge passageway,
    (b) means introducing predetermined quantities of powdered material and liquid substantially simultaneously into the upper portion of said chamber,
    (c) a mixing element mounted for rotation about a vertical axis within said chamber concentric with and spaced from said frusto-conical bottom a distance permitting upward flow of air therebetween while said mixing element is rotating at a speed to impart outward and upward movement to the powdered material and liquid and permitting downward flow of said liquid and powdered material therebetween while said mixing element is stationary, and
    (d) means to rotate said mixing element for a predetermined time at a speed to impart outward and upward movement to the powdered material and liquid and to draw air into the chamber through said discharge passageway so that said powdered material and liquid are mixed with air and do not pass downwardly through said discharge passageway until the speed of rotation of said mixing element is reduced.

2. Apparatus for mixing powdered material with liquid as defined in claim 1 in which the means introducing powdered material comprises:
    (a) a generally horizontal auger housing extending inwardly of said mixing chamber,
    (b) means supplying powdered material to said auger housing,
    (c) an auger mounted for rotation in said auger housing and terminating in spaced relation to the discharge end of said auger housing, and
    (d) means to rotate said auger at a predetermined speed and for a predetermined length of time to introduce a predetermined quantity of powdered material into said mixing chamber.

3. Apparatus for mixing powdered material with liquid as defined in claim 1 in which the means introducing liquid comprises:
    (a) a generally annular liquid supply manifold encircling the upper portion of said mixing chamber,
    (b) there being discharge openings in said manifold for discharge liquid into said mixing chamber,
    (c) means supplying a predetermined quantity of liquid to said mixing chamber for each quantity of powdered material introduced.

4. Apparatus for mixing powdered material with liquid as defined in claim 1 in which said frusto-conical bottom defines with a horizontal plane passing therethrough an included angle ranging from 35° to 55°.

5. Apparatus for mixing powdered materials with liquid as defined in claim 1 in which said frusto-conical bottom defines with a horizontal plane passing therethrough an included angle of approximately 45°.

6. Apparatus for mixing powdered material with liquid as defined in claim 1 in which the mixing element comprises:
    (a) a shaft supported for rotation about a vertical axis and concentric with said frusto-conical bottom, and
    (b) angularly spaced mixer blades operatively connected to said shaft and adapted for pivotal movement relative thereto.

7. Apparatus for mixing powdered material with liquid as defined in claim 1 in which the downwardly converging, frusto-conical bottom is provided with an annular portion directly opposite said mixing element which extends in a generally vertical plane.

8. Apparatus for mixing powdered material with liquid as defined in claim 1 in which the liquid is chilled prior to introduction into said chamber.

References Cited

UNITED STATES PATENTS

| | | | |
|---|---|---|---|
| 2,027,756 | 1/1936 | Tay | 259—43 |
| 2,254,236 | 9/1941 | Myers. | |
| 2,805,051 | 9/1957 | Miller | 259—8 XR |
| 3,023,175 | 2/1962 | Rodman | 259—8 XR |

WALTER A. SCHEEL, *Primary Examiner.*

JOHN M. BELL, *Assistant Examiner.*

U.S. Cl. X.R.

259—23, 43, 122